Patented Dec. 18, 1928.

1,695,642

UNITED STATES PATENT OFFICE.

CARLETON ELLIS, OF MONTCLAIR, NEW JERSEY, ASSIGNOR TO CHADELOID CHEMICAL COMPANY, A CORPORATION OF WEST VIRGINIA.

VARNISH.

No Drawing. Application filed March 22, 1924, Serial No. 701,028. Renewed September 10, 1927.

This invention relates to a coating composition, and a particular embodiment thereof is a varnish reviver. This application is in part a continuation of co-pending application Serial No. 442,245 filed Feb. 3, 1921. The invention, in so far as it relates to a varnish reviver has for its object the production of a composition which is intended to be brushed or sprayed over varnished surfaces such as automobile finishes to brighten or revive the finish, or into which objects may be dipped to accomplish this purpose. When such surfaces become dull, it has heretofore been proposed to restore them by applying solutions of waxes, oils, or even thin varnish solutions. Oftentimes such compositions consist mainly of non-drying oil such as petroleum oils thinned with gasoline. While the first effect of the oil is to brighten the surface, dust quickly collects. The thin varnish solutions which are proposed will dry in a day or so but an automobile cannot safely be used an hour or two after the application of such a resin composition. Furthermore these varnish coatings contain acid resins, and are quickly affected by ammonia of the air, alkali from the soap used in washing and various atmospheric agencies, mud, etc.

In the present invention it is an object to produce a quick drying solution which may be applied readily, for example, by spraying over the surface of varnish or paint, and particularly the surfaces of automobiles or other vehicles to form an extremely thin resistant coating which is not readily affected by ammonia or other alkalis, or acids, or atmospheric influences detrimental to ordinary varnish.

Chlorinated rubber is suitable for this purpose, and likewise chlorinated gutta percha. The latter may be made by passing chlorine gas through a solution of gutta percha in a suitable solvent, or by chlorinating dry gutta percha by exposing it to the action of chlorine gas under superatmospheric pressure. Gutta percha commonly is associated with a considerable amount of resinous material, and this may be chlorinated along with the gutta percha itself.

Chlorinated gutta percha is a yellow solid, which dissolves readily in volatile solvents such as benzol, and its homologs, carbon tetra-chloride, and the like. These solutions are less viscous than those of corresponding concentration in which chlorinated rubber is employed, and hence it is possible to use solutions containing a larger proportion of solids. Chlorinated gutta percha solutions upon evaporating from a surface, leave a bright, hard film, which however is rather brittle, and may contain white areas, especially if a low boiling solvent such as benzol has been used.

The addition of small amounts of material such as the phenol phosphates, triphenyl and tricresyl phosphates, eliminates the formation of these areas, and also reduces the brittleness of the films. Resins such as rosin or fossil resins may be added, and these also favor the formation of clear films, as well as enhancing the lustre. The hard or fossil resins should be heated or run at various temperatures such as are employed in the manufacture of varnishes, in order that they may be put into solution. Other resins such as synthetic resins and hydrocarbon resins may be used in special cases. The latter is of especial value in case where the coating is subsequently likely to be treated with alkalis, or strongly alkaline soap, as in washing, since such resins are "non-acid" and are not readily attacked by alkalis.

Such substances as those mentioned, which prevent blushing and otherwise modify the solution may be termed homogenizing agents. The proportion of such homogenizing agent is usually not in excess of the chlorinated gutta percha, and frequently one-half the amount is sufficient. The solvent employed should be one which will dissolve both the chlorinated gutta percha and the homogenizing agent. The aromatic hydrocarbons are generally speaking best for this purpose, and the more volatile such hydrocarbon, the quicker drying will be the product. It is preferable for best results not to employ too viscous a solution, as these cannot be spread as rapidly and evenly as thinner ones.

Drying oils such as linseed or tung oil may be introduced in some cases, but these tend to delay the drying.

I have discussed the use of this product as a varnish reviver. It will be understood that the solution can be employed for other purposes. The proportions mentioned above may be varied between wide limits, depending upon various conditions, and the nature of the service to which the composition is to be put.

In the foregoing, chlorinated gutta percha has been referred to, but it is to be understood that the use along with chlorine of bromine, or other halogens in making a chlorinated product is not precluded, since included within the purview of this invention are chlorinated gutta percha products, or chlorinated gutta percha derivatives which may contain other elements than simply chlorine, carbon and hydrogen, all to such extent as such products function in a manner similar or analogous to true chlorinated gutta percha.

No claim is made herein to the use of chlorinated rubber as the base of the composition, such subject matter being covered in my U. S. Patent 1,541,693.

What I claim is:—

1. A quick-drying composition adapted for use as a varnish reviver, comprising chlorinated gutta percha, a solvent therefor and a non-acid resin.

2. A composition adapted for use as a varnish reviver, comprising chlorinated gutta percha, a solvent therefor and a resinous homogenizing agent.

3. A composition, adapted for use as a varnish reviver, comprising chlorinated gutta percha, a solvent therefor and a homogenizing agent comprising a phosphate of a phenolic body.

4. A composition, adapted for use as a varnish reviver, comprising chlorinated gutta percha, a solvent therefor and a homogenizing agent comprising cresyl phosphate.

5. A composition, adapted for use as a varnish reviver, comprising chlorinated gutta percha, and aromatic solvent therefor, a resin and a phenolic phosphate.

6. A solution containing a chlorinated gutta percha and a solvent therefor, and a homogenizing agent, as herein described, such composition adapted for use as a varnish reviver.

CARLETON ELLIS.